United States Patent [19]
Ulbers

[11] Patent Number: 4,900,151
[45] Date of Patent: Feb. 13, 1990

[54] DEVICE FOR MEASURING THE DISTANCE BETWEEN THE DEVICE AND A MEASURING SURFACE

[75] Inventor: Gerd Ulbers, Wëilersbach, Fed. Rep. of Germany

[73] Assignee: Hommelwerke GmbH, Schwenningen, Fed. Rep. of Germany

[21] Appl. No.: 182,097

[22] Filed: Apr. 15, 1988

[30] Foreign Application Priority Data

May 11, 1987 [DE] Fed. Rep. of Germany ....... 3715627

[51] Int. Cl.⁴ .............................................. G01B 9/02
[52] U.S. Cl. ...................................................... 356/358
[58] Field of Search ......................................... 356/358

[56] References Cited

U.S. PATENT DOCUMENTS 4,717,255  1/1988  Ulbers .......................... 356/359 X
4,744,661  5/1988  Ulbers et al. ........................ 356/358

Primary Examiner—Davis L. Willis
Assistant Examiner—Matthew W. Koren
Attorney, Agent, or Firm—Allegretti & Witcoff, Ltd.

[57] ABSTRACT

A laser optical apparatus for measuring the distance between the apparatus and a measuring surface which comprises an optical measuring reflector on said measuring surface, a converting transformer for converting the position of said reflector into corresponding electrical signals and an indicator for said signals. The improvement comprises a first optical interferometer having a measuring wave guide coupled with a reference wave guide and a second optical interferometer also having measuring and reference wave guides. The length of the second measuring wave guide is different from the length of the second reference wave guide and a computer is used to compare output electrical signals the value of which depend upon this difference. The apparatus also includes a device to correct the wave length of the laser beam by controlling the electrical current to the laser.

14 Claims, 4 Drawing Sheets

DEVICE FOR MEASURING THE DISTANCE BETWEEN THE DEVICE AND A MEASURING SURFACE

The invention relates to a laser optical apparatus for accurately measuring long distances, in the meter range, as compared with similar devices disclosed in the prior art which are capable of measuring only very short distances.

THE PRIOR ART

The German patent application P 36 30 887 describes a device for measuring small lengths, having a scanning tip supported in a movable manner in the direction of the length to be measured, a transformer for converting the movements of the scanning tip into corresponding electrical signals, and an indicating device for indicating these signals. This device is characterized in that the transformer contains an optical interferometer which has a measuring wave guide, one end of which is connected with a laser and the other end of which is connected with an optical device, which directs the light onto a measuring mirror positioned at a distance, which reflects the light to the optical device, and which is connected with the scanning tip or a part which moves with the tip. The interferometer has a reference wave guide, which is connected with the measuring wave guide, and has on its one end a mirror and, on its other end, a photoelectrical transformer, which is connected with the indicating device for indicating the electrical output signals of the photoelectrical transformer. It therefore involves a special device for measuring very small lengths through the interposition of a mechanical scanner, the bearing or position of which is determined and evaluated as a standard for the length measured. This known device is not suited for measuring very great lengths, since the wavelength of the laser, which, with known lasers, is not sufficiently constant, despite maintaining constant temperature and current. Accurate measurement of the length depends upon a constant wave length.

SUMMARY OF THE INVENTION

The object of the invention is to provide a device of this type for measuring the distance between the device and a measuring surface, with which it is possible to measure great lengths, in the meter range, and to do so, with great precision.

The invention is based on the concept of measuring the distance to be determined essentially with the help of an optical interferometer, in the measuring light path of which the distance between the device and the measuring device is incorporated. The light from one measuring wave guide is directed in simple manner onto the surface to be measured, from which it returns to the measuring wave guide after being reflected. On the basis of the utilization of the interferometer, the measuring precision lies in the order of magnitude of the wavelength of the light used if a phase measurement takes place. Phase measurement using an interferometer is fundamentally already known; see the periodical "Laser und Optoelektronik", 1/1984, page 19, FIG. 3.

In order to be able to practically utilize the fundamentally high precision of a device for length measurement working with an interferometer, the basic concept of the invention proceeds further, by stabilizing the wavelength of the light used for the measurement. This is done by feeding the light into a second interferometer, in which the light paths are constant, to create a light wavelength norm. To create an output signal for the second interferometer, which depends on changes of the wavelength, the light proceeds along different distance paths to an interference unit, so that, during changes of wavelengths, phase shifts arise at the point of interference, thereby changing the output signal of the interferometer. The output signal can be utilized, for example, to correct the wavelength of the light of the laser by altering the feed current to the laser or to correct the indication of the indicating device for the measured length.

The indicating device can be digital and cooperate with a counter connected in series, which counter counts, for example, the zero passages of the output signal of the first interferometer serving for the actual measurement. Since the distance or the length can increase or decrease from a given output point, three means are provided in accordance with the invention, which, during changes in wavelengths, produce rotary fields, which make possible a two-way counting so that changes in distance or length can be measured in two directions.

The interferometers employed can have any chosen construction. Instead of photoconductors, photoconductive surface layers can also be used, such as are already generally known.

The light cast on the measuring surface by the device can be a parallel bundle of rays or even focussed light. The optical measuring reflector on the measuring surface is formed by the measuring surface itself, or by a reflector positioned on the measuring surface, in the form of at least one glass sphere or a mirror.

In using the device of the invention, a measurement of a known path is suitable for the purpose of calibration, which can be carried out, for example, by means of a known stroke of a piezocrystal under the measuring mirror. The size of the necessary correction during changes in wavelengths depends on the difference of the various paths of the light in the second interferometer, which are decisive for the level of the interference. This differnce can be selected as desired in the device, but can be firmly so selected as well. If the correction value must precisely compensate for the errors on the basis of wavelength changes, then an alternative form of the invention may be used, in accordance with which the light path difference in the second interferometer decisive for the interference, is related to half the wavelength of the light used, and the evaluation of the correction is subsequently determined.

In addition to the second interferometer, a third interferometer can also be used, which is constructed and connected in precisely the same way as the second interferometer, but has, however, an air gap between the reference reflector and the measuring wave guide. This is a variable in the path of the light, since this path depends on the diffraction index of the air in the air gap. The output signal of this third interferometer is consequently dependent on the diffraction index of the air, so that it is possible to correct the measurement of the distance or the path with the device in accordance with the invention, even with changes in the diffraction index of the air. This theory has inventive significance in itself, since it represents a simple possibility of measuring the diffraction index of the air and its changes.

BRIEF DESCRIPTION OF THE DRAWINGS

The invention will now be illustrated in greater detail by means of the drawings.

DESCRIPTION OF SPECIFIC EMBODIMENTS

Figure 1:
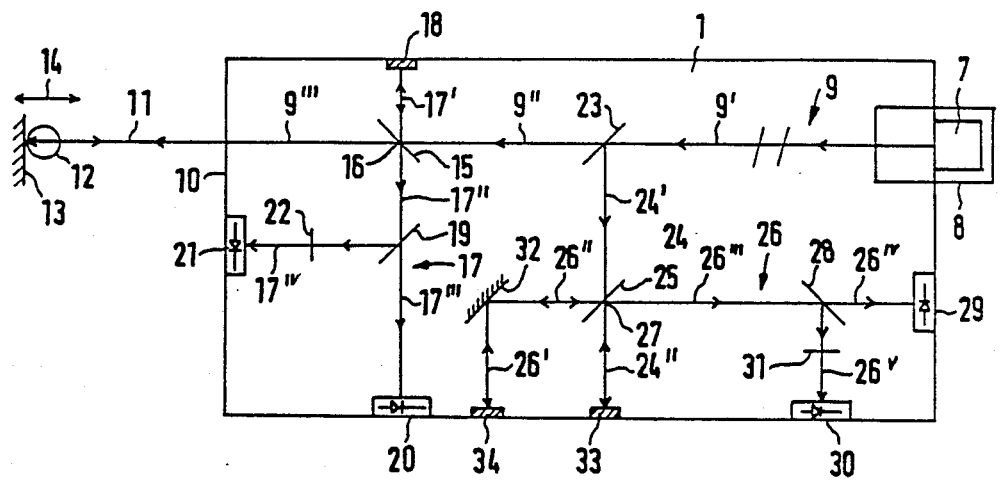
FIG. 1 schematically depicts in a plan view one example of execution of the invention.
Figure 2:
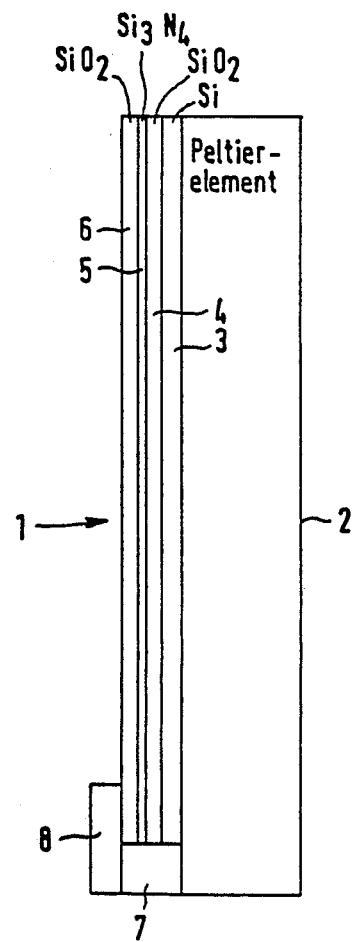
FIG. 2 depicts an enlarged simplified lateral view of the device of FIG. 1.

FIG. 1 depicts a plate 1, which, as is evident from FIG. 2, is attached to a Peltier element, and consists of layer 3 of Si; layer 4 of $SiO_2$; layer 5 of $Si_3N_4$; and layer 6 of $SiO_2$. As is evident in FIG. 1, several photoactive elements and leads are positioned in the layer 5, an optical measuring reflector. A laser 7, which emits light into the layer 5, is positioned laterally on the plate 1. On the laser 7, there is also positioned a temperature sensor 8, with the help of which the Peltier element 2 is so controlled that the temperature can be kept constant to a considerable degree.

As is evident from FIG. 1, the laser 7 radiates into a measuring wave guide 9 with components $9^I$, $9^{II}$ and $9^{III}$. The end segment $9^{III}$ of the measuring wave guide opposite the laser 7 discharges from one edge 10 in the plate 1, where the light emerges as a beam 11 and strikes on a measuring reflector 12. Reflector 12 is located on a measuring surface 13, the distance of which from the edge 10 is to be measured by means of the device, and can be varied, which is indicated by a double arrow 14.

The measuring wave guide 9, by means of a beam divider 15, is connected with a first reference wave guide 17 in the area of a connecting point 16, which reference wave guide is divided into individual segments $17^I$, $17^{II}$ and $17^{III}$. The segment $17^I$ leads to a mirror 18, whereas, at the other side of the connecting point 16, the segment $17^{II}$ of the reference wave guide 17 leads to a beam divider 19 by which the light is at once separated into the segments $17^{III}$ and $17^{IV}$. The light segment $17^{IV}$ leads to a photodiode 21 and contains a phase shifter 22 which rotates the phase of the light by 90°, so that the output signals of the photodiodes 20 and 21 are displaced by 90°, and their electrical output signals can be used to produce a rotary field.

Between the segments $9^I$ and $9^{II}$ of the measuring wave guide 9, there is located a beam divider 23 which causes light from the measuring wave guide 9 to produce a second measuring wave guide 24, which is divided into the segments $24^I$ and $24^{II}$. Beam divider 25 produces a second reference wave guide 26 which is divided into segments $26^I$, $26^{II}$, $26^{III}$, $26^{IV}$ and $26^V$. The beam divider 25 is located at a connecting point 27. Both segments $26^{IV}$ and $26^V$ emanate from a beam divider 28 in the second reference wave guide 26 to photodiodes 29 and 30. A phase shifter 31 is positioned in the segment $26^V$ which phase shifter rotates the phase of the light by 90°, so that the electrical output signals of photodiodes 29 and 30 are displaced by 90° in phase, and can thus to form a rotary field.

Between the segments $26^I$ and $26^{II}$ there is located a deflecting mirror 32. A reference reflector 33 is located at the end of the segment $24^{II}$ of the second measuring wave guide 24 while a mirror 34 is located at the end $26^I$ of the second reference wave guide 26.

The length of the segment $24^{II}$ of the second measuring wave guide 24 is shorter than the sum of the lengths of the segments $26^I$ and $26^{II}$ of the second reference wave guide 26. This means that during changes of wavelengths, the interference and thereby the light on the photodiodes 29 and 30 and the output signals of the same, changes as well. This change serves as a correction value to the correction of the wavelength of the laser 7, as will be illustrated in the discussion relating to FIG. 3.

The interferometer formed essentially from the first measuring wave guide 9 and the first reference wave guide 17 serves for the actual measuring. If the distance between the edge 10 of the plate 1 and the measuring reflector 12 or the measuring surface 13 changes, then the interference in the area of the connecting point 16 changes as well. This caused the light to the photodiodes 20 and 21 to emit signals which correspond to the change of the distance between the edge 10 and the measuring reflector 12 and thus are a standard for the changes in distance. If absolute measurements are to be carried out, then the measuring reflector 12 is moved by a known distance, preferably away from the edge 10 and the device or its indicating device is correspondingly calibrated.

Figure 3:
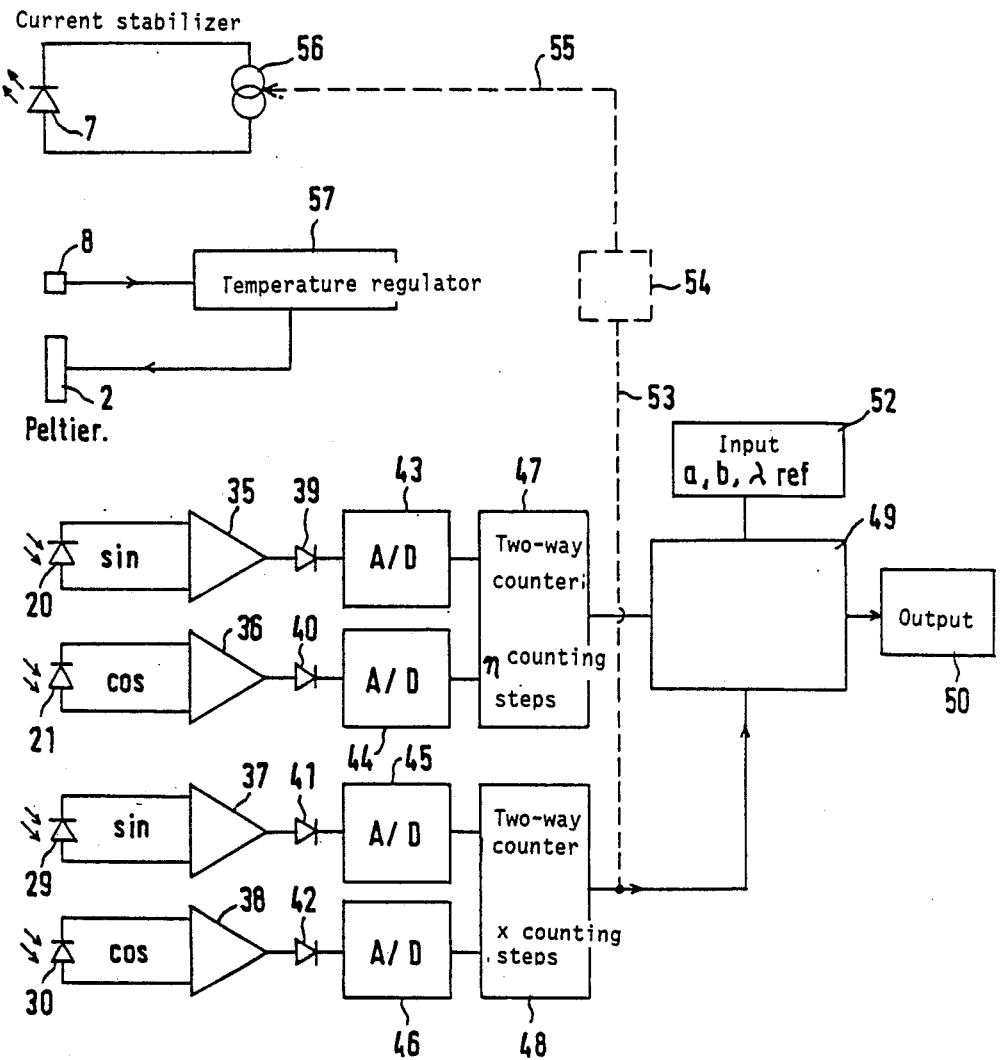
FIG. 3 depicts a block diagram of the evaluation and indicating device connected to the device in accordance with FIG. 1.

In the block diagram in accordance with FIG. 3, the photodiodes 20, 21 and 29, 30 supply signals to the two-way counter via the amplifiers 35–38, diodes 39–42 and analogue/digital transformers 43–46. The two-way counter 47 supplies an output signal to the computer 49 which corresponds to the distance changes between the edge 10 and the measuring reflector 12 in FIG. 1. The computer 49 supplies a corresponding digital value to a digital indicating device 50.

The output signal of the two-way counter 48 depends on the change of wavelength of the laser 7 and it reaches the computer 49 which so corrects the measuring signal of the two-way counter 47, that the indication in the indicating device 50 precisely corresponds to the length measured. In this it is still necessary that the correction value is evaluated by the two-way counter 48, with consideration given to the difference between the distance a from the connecting point 27 to the mirror 34 and the distance b between the connecting point 27 and the reference reflector 33. Furthermore, the reference wavelength $\lambda_{ref}$ must receive consideration. The values a, b and $\lambda_{ref}$ can be fed into the computer 49 by means of an input device 52.

From the two-way counter 48, the output signals arrive via a line 53 at a digital/analogue transformer 54 which conducts an analogue correction signal, via a line 55 into a power supply 56 for the laser 7. The parts 53, 55 are depicted with dotted lines, since there is involved in the connection an alternative to the regulation of the wavelength of the light emitted by the laser 7.

A temperature regulator 57 is furthermore depicted in FIG. 3 which receives a signal from the temperature sensor 8 and feeds the Peltier element 2 in order to maintain the temperature constant.

The light paths a and b are selected arbitrarily, but definitely during production. Both these paths are, as already shown, input into the computer 49 one time. The computer than determines, with the help of the numerical value x of the two-way counter 48 an alteration of the wavelength $\lambda_{ref}$ of the laser 7. If the numerical value of the two-way counter 48 is termed x, then the path determined $$S = x \frac{\lambda}{2} \text{ ref}$$

must be corrected as follows, with alteration of $\lambda_{ref}$ by $\Delta\lambda$:

For every $\lambda/2$, a counting step x in the Michelsen interferometer is obtained. When changing the wavelength $\lambda_{ref}$, y counting steps are obtained in the second interferometer:

$$y = \frac{b-a}{\frac{\lambda \text{ ref}}{2}} - \frac{b-a}{\frac{\lambda \text{ ref} + \Delta\lambda}{2}} \quad (1)$$

$$y = \frac{2(b-a)}{\lambda \text{ ref}} - \frac{2(b-a)}{\lambda \text{ ref} + \Delta\lambda} \quad (2)$$

From this it follows that:

$$\Delta\lambda = \frac{2(b-a)\lambda_{ref}}{2(b-a) - \lambda_{ref}} - \lambda_{ref} \quad (3)$$

$\lambda_{ref}$ is a wavelength of the semi-conductor laser, to which all deviations are related. $\lambda_{ref}$ must be determined through the measurement of a known path S from equation 1, for example, through the known stroke of a piezocrystal under the measuring mirror.

The wavelength to be coordinated to the numerical value x is the following:

$$\frac{\lambda_{ref}}{2} + \frac{\Delta\lambda}{2} \quad (4)$$

The corrected measuring path $S^I$ is now:

$$S' = x\left(\frac{\lambda \text{ ref}}{2} + \frac{\Delta\lambda}{2}\right) \quad (5)$$

$$S' = x\left(\frac{\lambda \text{ ref}(b-a)}{2(b-a) - y \cdot \lambda_{ref}}\right) \quad (6)$$

The value for $\lambda_{ref}$ is fed into the computer 49 and there is obtained as output the exact value $S^I$ for the path of the measuring reflector 12, which is completely free of wavelength variations of the laser 7. The measuring uncertainty for $S^I$ is essentially only determined by the measuring uncertainty of $\lambda_{ref}$.

Figure 4:
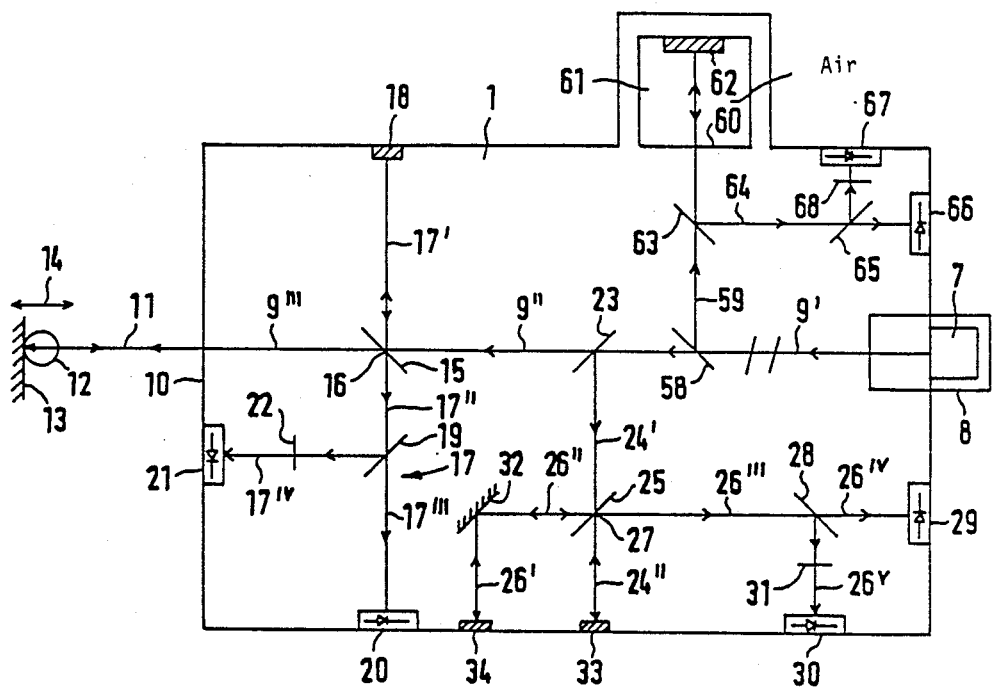
FIG. 4 depicts an alternative form of the device shown in FIG. 1.

FIG. 4 depicts an alternative embodiment of the invention of FIG. 1 comprising a third interferometer. The same parts are provided with the same reference numbers. A branching mirror 58 is additionally positioned in the measuring wave guide 9 which directs light into a third measuring wave guide 59. The light emerges from this measuring wave guide 59 on one edge 60 and proceeds through an air gap 61 to a mirror 62 and from there is again reflected through the air gap 61 back into the measuring guide 59. A branching mirror 63 is positioned in guide 59 from which a third reference wave guide 64 emanates and leads from an additional branching mirror 65 to the photodiodes 66 and 67. A phase shifter 68 is positioned in the light path to the photodiode 67 which rotates the phase by 90°, so that the output signals of the photodiodes 66 and 67 are displaced by 90°, to produce a rotary field by means of which a two-way counter can be fed. The output signal of the counter as well as that of the other two-way counters 47, 48 are fed into the computer 49. This correction value is dependent on the diffraction index of the air in the air gap 61. In this way, the measuring value can be corrected for the diffraction index of the air. The electrical circuit between the photodiodes 66 and 67 and the computer 49 is constructed in the same manner as that between the photodiodes 29, 30 and the computer 49, as shown in FIG. 3.

What is claimed is:

1. In an apparatus for measuring the distance between the apparatus and a measuring surface comprising a scanning means on the measuring surface, a converting transformer for converting the position of the scanning means into corresponding electrical signals and an indicator for said signals, the improvement in which said scanning means is an optical measuring reflector positioned on or connected to said measuring surface;

said converting transformer comprises a first optical interferometer having a laser, a first measuring wave guide, one end of which is directed to said laser and the other end of which is directed to said measuring reflector which reflects the light into said first measuring wave guide;

said first interferometer having a first reference wave guide coupled with said first measuring wave guide, a mirror on one end of said first reference wave guide and a first photoelectrical transformer on the other end of said first reference wave guide, an indicator connecting to said first photoelectric transformer for indicating the electrical output signal thereof;

said converting transformer further comprises a second optical interferometer having a second measuring wave guide one end of which is directed to said laser, the other end of which is directed to a reference reflector fixed to said apparatus, and having a second reference wave guide coupled to said second measuring wave guide at a connecting point, said second reference wave guide having a mirror at one end and a second photoelectrical transformer at its other end;

the length of said second measuring wave guide is different from the length of second reference wave guide, said lengths being measured from said connecting point to said mirror and from said connecting point to said reference reflector, respectively;

a comparing device is positioned between said first photoelectric transformer and said indicator, and between said second photoelectric transformer and said indicator, for receiving the output signals of said transformers, said comparing device producing an output signal the value of which depends upon the difference between the signals received;

said apparatus includes a correcting device to correct the wave length of the light emanating from said laser.

2. The apparatus of claim 1 in which said indicator is a digital device with a counter connected in series.

3. The apparatus of claim 2 in which said first and second reference wave guides each connect with a branch wave guide, each branch wave guide connecting to an additional photoelectric transformer and including a phase adjusting means to shift the phase of the light on said additional photoelectric transformers 90° relative to said first and second photoelectric transformers to produce a rotational field, and in which said apparatus comprises means for determining the rotational direction of said fields and two-way counting meters, the counting direction of which depends upon the direction of said rotational field.

4. The apparatus of claim 3 in which said phase adjusting means is formed by two electrodes which extend on both sides of said branch wave guides and connect to an adjustable direct current voltage.

5. The apparatus of claim 3 in which said phase adjusting means are formed by small λ/4 plates.

6. The apparatus of claim 3 in which comparing device is a computer connected in series with said two-way counting meters which computer determines the difference between the numerical values of the output of said first and second photoelectric transformers and adds that value to the numerical value of the output of said counting meters feeding said indicator.

7. The apparatus of claim 6 in which one of said two-way counting meters is connected in series to said second interferometer, and includes an input device connecting to said computer, into which input device said lengths (a, b) are fed as λ/2 units, λ being the wavelength of said laser, and said computer corrects said numerical value from said one two-way counting meter in accordance with the formula $(b-a)/(\lambda/2)$.

8. The apparatus of claim 1 in which said measuring wave guides and said reference wave guides are disposed on the surface of a common plate; said laser and photoelectric transformers are attached to one edge of said plate where said wave guides terminate; and that said mirror on the end of said second wave guide is formed by a mirrored lateral edge of said plate.

9. The apparatus of claim 8 which includes optical means directing light on said measuring reflector, said optical means being mounted on the surface of said plate.

10. The apparatus of claim 8 in which said laser and said photoelectrical transformers are integral with said plate.

11. The apparatus of claim 1 wherein said correcting device is a diode laser which controls the electric current to said laser.

12. The apparatus of claim 1 wherein said correcting device comprises a counter connecting to said comparing device, a digital/analogue transformer connected in series to said counter, and a diode laser for controlling the electrical current to said laser.

13. The apparatus of claim 1 which includes a third interferometer constructed and connected in the same way as said second interferometer, but also includes an air gap between said optical measuring reflector and a measuring wave guide comprising a branch of said first measuring wave guide.

14. In an apparatus for measuring the distance between the apparatus and a measuring surface comprising a scanning means on the measuring surface, a converting transformer for converting the position of the scanning means into corresponding electrical signals and an indicator for said signals, the improvement in which said scanning means is an optical measuring reflector positioned on or connected to said measuring surface;

said converting transformer comprises a first optical interferometer having a laser, a first measuring wave guide, one end of which is directed to said laser and the other end of which is directed to said measuring reflector which reflects the light into said first measuring wave guide;

said first interferometer having a first reference wave guide coupled with said first measuring wave guide, a mirror on one end of said first reference wave guide and a first photoelectrical transformer on the other end of said first reference wave guide, an indicator connecting to said first photoelectric transformer for indicating the electrical output signal thereof;

said converting transformer further comprises a second optical interferometer having a second measuring wave guide one end of which is directed to said laser, the other end of which is directed to a reference reflector fixed to said apparatus, and having a second reference wave guide coupled to said second measuring wave guide at a connecting point, said second reference wave guide having a mirror at one end and a second photoelectrical transformer at its other end;

the length of said second measuring wave guide is different from the length of second reference wave guide, said lengths being measured from said connecting point to said mirror and from said connecting point to said reference reflector, respectively;

a comparing device is positioned between said first photoelectric transformer and said indicator, and between said second photoelectric transformer and said indicator, for receiving the output signals of said transformers, said comparing device producing an output signal the value of which depends upon the difference between the signals received;

said apparatus includes a correcting device to correct the wave length of the light emanating from said laser;

apparatus to correct the indication of said indicator.

* * * * *